United States Patent
Wang et al.

(10) Patent No.: US 12,504,884 B2
(45) Date of Patent: Dec. 23, 2025

(54) SERVICE LIFETIME MONITORING AND EARLY WARNING METHOD, MEMORY STORAGE DEVICE AND MEMORY CONTROL CIRCUIT UNIT

(71) Applicant: Hefei Core Storage Electronic Limited, Anhui (CN)

(72) Inventors: Chih-Ling Wang, Anhui (CN); Qi-Ao Zhu, Anhui (CN); Dong Sheng Rao, Anhui (CN)

(73) Assignee: Hefei Core Storage Electronic Limited, Anhui (CN)

( * ) Notice: Subject to any disclaimer, the term of this patent is extended or adjusted under 35 U.S.C. 154(b) by 0 days.

(21) Appl. No.: 18/510,608

(22) Filed: Nov. 15, 2023

(65) Prior Publication Data
US 2025/0123752 A1    Apr. 17, 2025

(30) Foreign Application Priority Data
Oct. 12, 2023 (CN) .......................... 202311324726.6

(51) Int. Cl.
*G06F 3/06*    (2006.01)
(52) U.S. Cl.
CPC .......... *G06F 3/0616* (2013.01); *G06F 3/0653* (2013.01); *G06F 3/0679* (2013.01)
(58) Field of Classification Search
CPC ..... G06F 3/0616; G06F 3/0653; G06F 3/0679
See application file for complete search history.

(56) References Cited

U.S. PATENT DOCUMENTS

| | | | |
|---|---|---|---|
| 2013/0179624 A1* | 7/2013 | Lambert | G06F 12/0246 711/E12.008 |
| 2016/0034206 A1* | 2/2016 | Ryan | G06F 3/064 711/103 |
| 2017/0131948 A1* | 5/2017 | Hoang | G06F 3/0679 |
| 2024/0256159 A1* | 8/2024 | Lee | G06F 3/0619 |

FOREIGN PATENT DOCUMENTS

CN    116090658    5/2023

OTHER PUBLICATIONS

"Office Action of Taiwan Counterpart Application", issued on Jul. 17, 2024, p. 1-p. 5.

* cited by examiner

*Primary Examiner* — Hosain T Alam
*Assistant Examiner* — Subir Kumar Chowdhury
(74) *Attorney, Agent, or Firm* — JCIPRNET (57) ABSTRACT

Disclosed are a service lifetime monitoring and early warning method, a memory storage device, and a memory control circuit unit. The method includes: reading a history information from a rewritable non-volatile memory module, calculating a remaining lifetime based on the history information and a user habit, generating an early warning signal, and outputting the remaining lifetime and the early warning signal in response to the remaining lifetime being lower than a preset lifetime.

3 Claims, 5 Drawing Sheets

SERVICE LIFETIME MONITORING AND EARLY WARNING METHOD, MEMORY STORAGE DEVICE AND MEMORY CONTROL CIRCUIT UNIT

CROSS-REFERENCE TO RELATED APPLICATION

This application claims the priority benefit of China application serial no. 202311324726.6, filed on Oct. 12, 2023. The entirety of the above-mentioned patent application is hereby incorporated by reference herein and made a part of this specification.

BACKGROUND

Technical Field

The invention relates to a memory management technology, and in particular to a service lifetime monitoring and early warning method, a memory storage device, and a memory control circuit unit.

Description of Related Art

Smartphones, tablets, and personal computers have grown rapidly in recent years, causing consumer demand for storage media to increase rapidly. Since rewriteable non-volatile memory modules (for example, a flash memory) have the characteristics of non-volatile data, power saving, small size, and no mechanical structure, the rewriteable non-volatile memory modules are very suitable for being built into various portable multimedia devices as exemplified above.

In addition, the rewritable non-volatile memory module may also be built into the vehicle-mounted device, which may be configured to store its remaining lifetime before leaving the factory and quality verification records of the multiple tests on the vehicle-mounted device undergone before leaving the factory (For example, results of an environmental test, a regular test or a special stringent test) or information such as the operating temperature and operating time of the vehicle-mounted device. However, most of today's vehicle-mounted devices only provide early warning when the battery is low (for example, displaying a warning light through an instrument panel), and do not issue early warnings when the remaining lifetime of the rewritable non-volatile memory module is insufficient.

SUMMARY

In view of this, the invention provides a service lifetime monitoring and early warning method, a memory storage device, and a memory control circuit unit, which may monitor the service lifetime of a rewritable non-volatile memory module and issue an early warning notification in response to the remaining lifetime of the non-volatile memory module being lower than the preset lifetime to improve the quality of the warning.

Exemplary embodiments of the invention provide a lifetime monitoring and early warning method for a memory storage device. The memory storage device includes a rewritable non-volatile memory module. The service lifetime monitoring and early warning method includes: reading history information from the rewritable non-volatile memory module, calculating remaining lifetime according to the history information and a user habit, generating an early warning signal in response to the remaining lifetime being lower than the preset lifetime, and outputting the remaining lifetime and the early warning signal.

In an exemplary embodiment of the invention, the history information includes a historical remaining lifetime, a max write size, a cumulative write size, and a write amplification factor (WAF).

In an exemplary embodiment of the invention, the remaining lifetime calculated according to the history information and the user habit includes: calculating a total bytes written (TBW) according to the max write size and the WAF.

In an exemplary embodiment of the invention, the remaining lifetime calculated according to the history information and the user habit includes: calculating the remaining lifetime according to the TBW, the cumulative write size, and the user habit.

In an exemplary embodiment of the invention, the user habit is an average write size per unit time.

In an exemplary embodiment of the invention, the service lifetime monitoring and early warning method further includes: obtaining a maximum operating temperature and a quality verification record from the rewritable non-volatile memory module.

In an exemplary embodiment of the invention, the service lifetime monitoring and early warning method further includes: determining reliability of the rewritable non-volatile memory module according to the maximum operating temperature and the quality verification record.

An exemplary embodiment of the invention further provides a memory storage device which includes a connection interface unit, a rewritable non-volatile memory module, and a memory control circuit unit. The connection interface unit is configured to couple to a host system. The memory control circuit unit is coupled to the connection interface unit and the rewritable non-volatile memory module. The memory control circuit unit is configured to read history information from the rewritable non-volatile memory module. The memory control circuit unit is further configured to calculate the remaining lifetime according to the history information and the user habit. The memory control circuit unit is further configured to generate the early warning signal and output the remaining lifetime and the early warning signal in response to the remaining lifetime being lower than the preset lifetime.

In an exemplary embodiment of the invention, the memory control circuit unit is further configured to calculate the TBW according to the max write size and the WAF.

In an exemplary embodiment of the invention, the memory control circuit unit is further configured to calculate the remaining lifetime according to the TBW, the cumulative write size, and the user habit.

In an exemplary embodiment of the invention, the memory control circuit unit is further configured to obtain the maximum operating temperature and the quality verification record from the rewritable non-volatile memory module.

In an exemplary embodiment of the invention, the memory control circuit unit is further configured to determine the reliability of the rewritable non-volatile memory module according to the maximum operating temperature and the quality verification record.

An exemplary embodiment of the invention further provides a memory control circuit which is configured to control a rewritable non-volatile memory module. The memory control circuit unit includes a host interface, a memory interface, and a memory management circuit. The host interface is configured to couple to a host system. The memory interface is configured to couple to the rewritable non-volatile memory module. The memory management circuit is coupled to the host interface and the memory interface. The memory management circuit is configured to read the history information from the rewritable non-volatile memory module. The memory management circuit is further configured to calculate the remaining lifetime according to the history information and the user habit. The memory management circuit is further configured to generate the early warning signal in response to the remaining lifetime being lower than a preset lifetime and output the remaining lifetime and the early warning signal.

In an exemplary embodiment of the invention, the memory management circuit is further configured to calculate the TBW according to the max write size and the WAF.

In an exemplary embodiment of the invention, the memory management circuit is further configured to calculate the remaining lifetime according to the TBW, the cumulative write size, and the user habit.

In an exemplary embodiment of the invention, the memory management circuit is further configured to obtain the maximum operating temperature and the quality verification record from the rewritable non-volatile memory module.

In an exemplary embodiment of the invention, the memory management circuit is further configured to record or determine the reliability of the rewritable non-volatile memory module according to the maximum operating temperature and the quality verification record.

Based on the above, the service lifetime monitoring and early warning method, the memory storage device and memory control circuit unit of the invention may calculate the remaining lifetime of the rewritable non-volatile memory module according to the historical remaining lifetime, the max write size, and the cumulative write size, the WAF, and the user habit in average write size per unit time of the rewritable non-volatile memory module and output the remaining lifetime and the early warning signal in response to the remaining lifetime being lower than the preset lifetime to improve the quality of early warning. On the other hand, the service lifetime monitoring and early warning method, the memory storage device, and the memory control circuit unit of the invention may also determine the reliability of the rewritable non-volatile memory module when the rewritable non-volatile memory module performs the data accessing according to the maximum operating temperature and the quality verification records to know its operating status.

DESCRIPTION OF THE EMBODIMENTS

Generally speaking, a memory storage device (also known as a memory storage system) includes a rewritable non-volatile memory module and a controller (also known as a control circuit). The memory storage device may be used with a host system, so that the host system may write data into the memory storage device or read data from the memory storage device.

Figure 1:
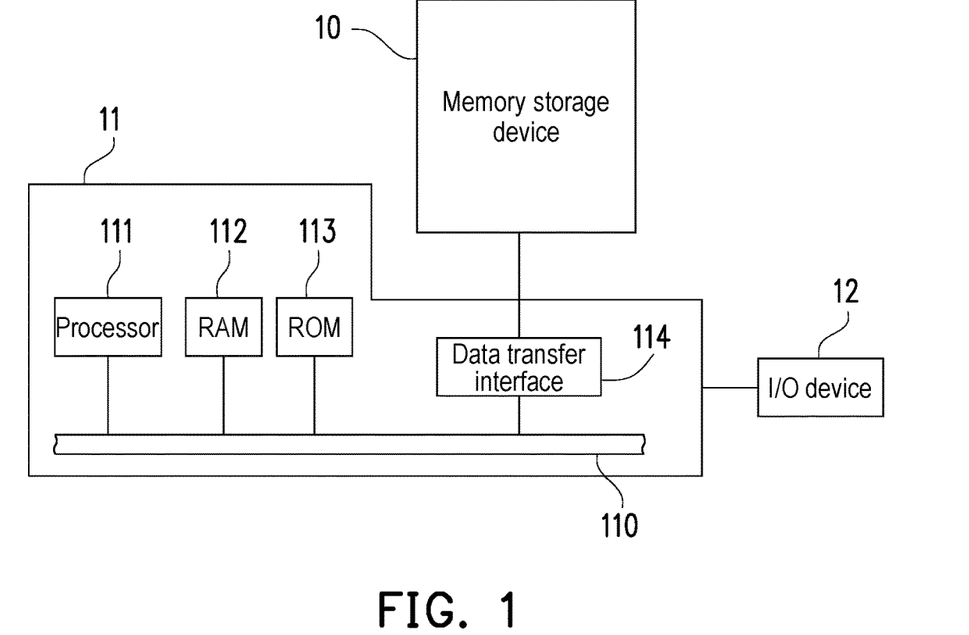
FIG. 1 is a block diagram of a host system, a memory storage device, and an input/output (I/O) device according to an exemplary embodiment of the invention.
Figure 2:
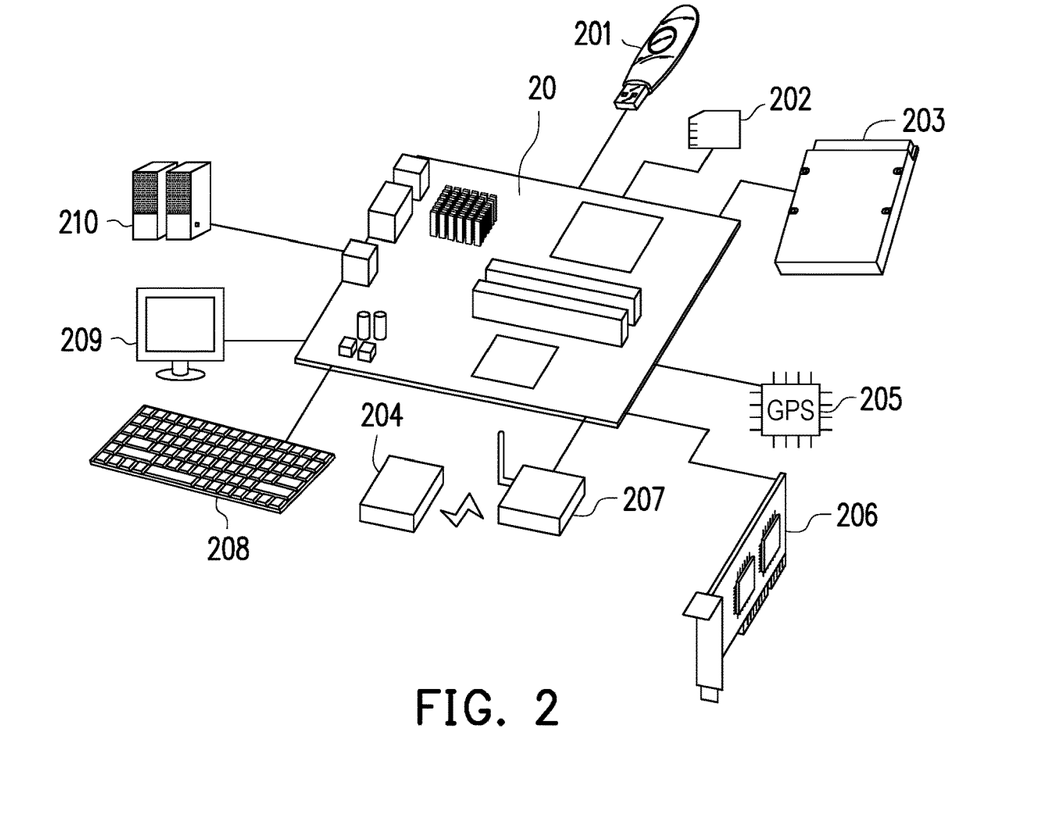
FIG. 2 is a schematic diagram of a host system, a memory storage device, and an I/O device according to an exemplary embodiment of the invention.

FIG. 1 is a block diagram of a host system, a memory storage device, and an input/output (I/O) device according to an exemplary embodiment of the invention. FIG. 2 is a schematic diagram of a host system, a memory storage device, and an I/O device according to an exemplary embodiment of the invention.

Referring to FIG. 1 and FIG. 2, a host system 11 may include a processor 111, a random access memory (RAM) 112, a read only memory (ROM) 113, and a data transfer interface 114. The processor 111, the RAM 112, the ROM 113, and the data transfer interface 114 may be coupled to a system bus 110.

In an exemplary embodiment, the host system 11 may be coupled to a memory storage device 10 through the data transfer interface 114. For example, the host system 11 may store data to or read data from the memory storage device 10 through the data transfer interface 114. In addition, the host system 11 may be coupled to the I/O device 12 through the system bus 110. For example, the host system 11 may transmit an output signal to the I/O device 12 or receive an input signal from the I/O device 12 through the system bus 110.

In an exemplary embodiment, the processor 111, the RAM 112, the ROM 113, and the data transfer interface 114 may be disposed on a motherboard 20 of the host system 11. The number of data transfer interfaces 114 may be one or multiple. Through the data transfer interface 114, the motherboard 20 may be coupled to the memory storage device 10 via wired or wireless methods.

In an exemplary embodiment, the memory storage device 10 may be, for example, a flash drive 201, a memory card 202, a solid state drive (SSD) 203 or a wireless memory storage device 204. The wireless memory storage device 204 may be, for example, a near field communication (NFC) memory storage device, a wireless fax (WiFi) memory storage device, a bluetooth memory storage device or a bluetooth low energy memory storage device (for example, iBeacon) or other memory storage devices based on various wireless communication technologies. In addition, the motherboard 20 may also be coupled to various I/O devices such as a global positioning system (GPS) module 205, a network interface card 206, a wireless transmission device 207, a keyboard 208, a screen 209, and a speaker 210 through the system bus 110. For example, in an exemplary embodiment, the motherboard 20 may access the wireless memory storage device 204 through the wireless transmission device 207.

In an exemplary embodiment, the host system 11 is a computer system. In an exemplary embodiment, the host system 11 may be any system which may substantially cooperate with the memory storage device 10 to store data. In an exemplary embodiment, the host system 11 is a vehicle-mounted system. In an exemplary embodiment, the memory storage device 10 and the host system 11 may respectively include a memory storage device 30 and a host system 31 of FIG. 3.

Figure 3:
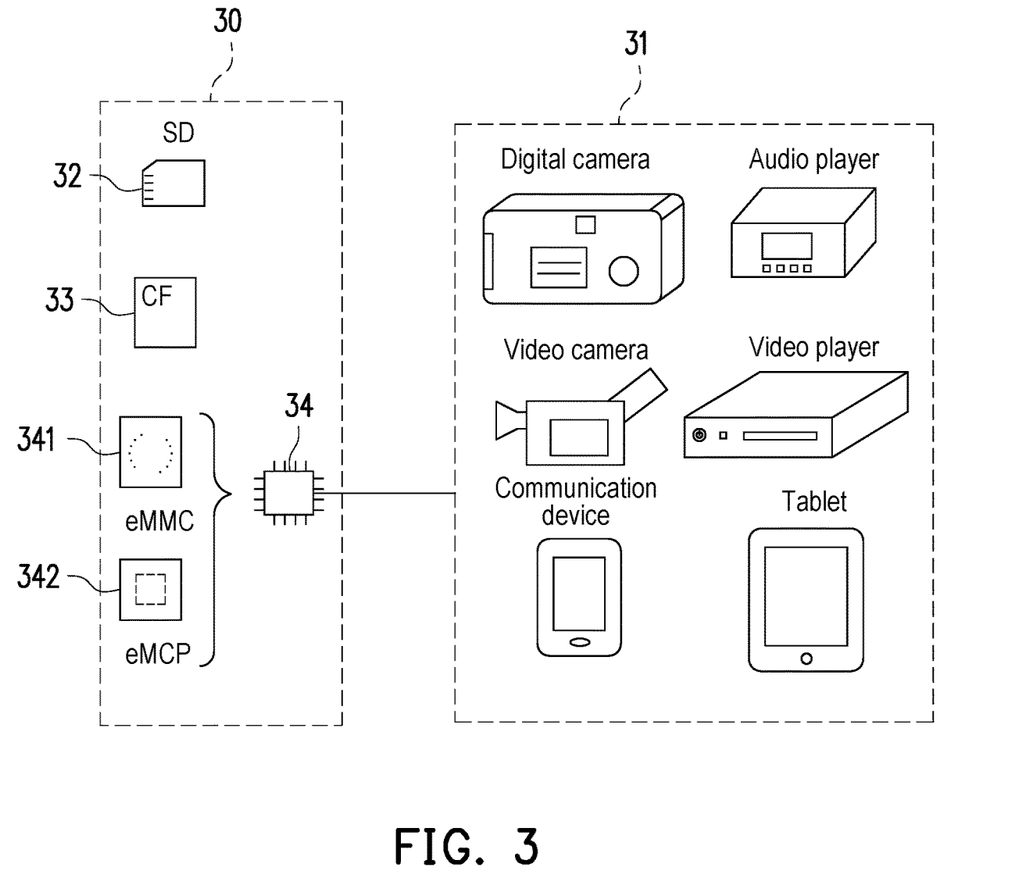
FIG. 3 is a schematic diagram of a host system and a memory storage device according to an exemplary embodiment of the invention.

FIG. 3 is a schematic diagram of a host system and a memory storage device according to an exemplary embodiment of the invention.

Referring to FIG. 3, the memory storage device 30 may be used in conjunction with the host system 31 to store data. For example, the host system 31 may be a system such as a digital camera, a video camera, a communication device, an audio player, a video player or a tablet. For example, the memory storage device 30 may be various non-volatile memory devices such as a secure digital (SD) card 32, a compact flash (CF) card 33 or an embedded storage device 34 used by the host system 31. The embedded storage device 34 includes various memory modules such as an embedded multi-media card (eMMC) 341 and/or an embedded multi-chip package (eMCP) storage device 342. The memory module is directly coupled to the embedded storage device on a substrate of the host system.

Figure 4:
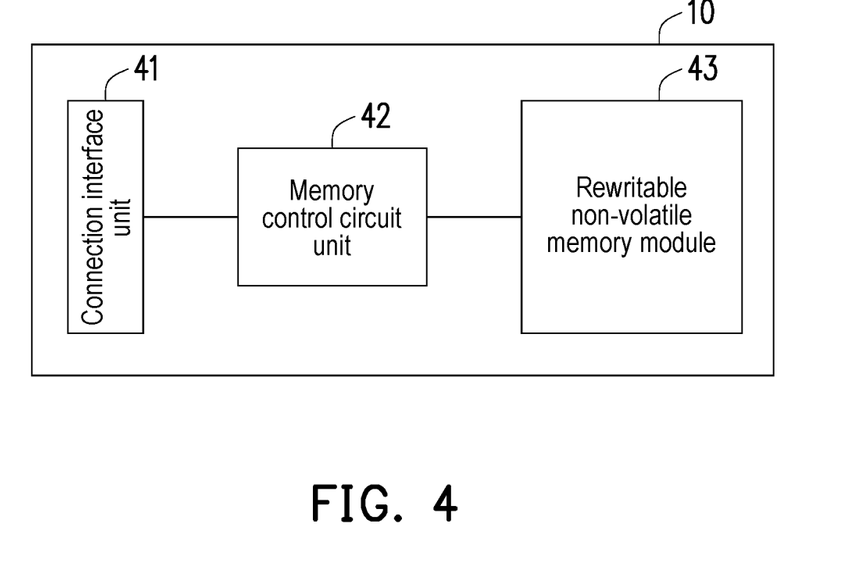
FIG. 4 is a block diagram of a memory storage device according to an exemplary embodiment of the invention.

FIG. 4 is a block diagram of a memory storage device according to an exemplary embodiment of the invention.

Referring to FIG. 4, the memory storage device 10 includes a connection interface unit 41, a memory control circuit unit 42, and a rewritable non-volatile memory module 43.

The connection interface unit 41 is configured to couple the memory storage device 10 to the host system 11. The memory storage device 10 may communicate with the host system 11 via the connection interface unit 41. In an exemplary embodiment, the connection interface unit 41 is compatible with the peripheral component interconnect express (PCI Express) standard. In an exemplary embodiment, the connection interface unit 41 may also be compliant with the serial advanced technology attachment (SATA) standard, parallel advanced technology attachment (PATA) standard, institute of electrical and electronics engineers (IEEE) 1394 standard, universal serial bus (USB) standard, SD interface standard, ultra high speed-I (UHS-I) interface standard, ultra high speed-II (UHS-II) interface standard, memory stick (MS) interface standard, MCP interface standard, MMC interface standard, eMMC interface standard, universal flash storage (UFS) interface standard, eMCP interface standard, CF interface standard, integrated device electronics (IDE) standard or other suitable standards. The connection interface unit 41 and the memory control circuit unit 42 may be packaged in a chip, or the connection interface unit 41 may be arranged outside a chip including the memory control circuit unit 42.

The memory control circuit unit 42 is coupled to the connection interface unit 41 and the rewritable non-volatile memory module 43. The memory control circuit unit 42 is configured to execute a plurality of logic gates or control instructions implemented in a hardware mode or a firmware mode and perform a data writing operation, a data reading operation, and a data erasing operation on the rewritable non-volatile memory module 43 according to the instructions of the host system 11.

The rewritable non-volatile memory module 43 is configured to store data written by the host system 11. The rewritable non-volatile memory module 43 may include a single level cell (SLC) NAND flash memory module (that is, a flash memory module which may store 1 bit in one memory cell), a multi-level cell (MLC) NAND flash memory module (that is, a flash memory module which may store 2 bits in one memory cell), a triple level cell (TLC) NAND flash memory module (that is, a flash memory module which may store 3 bits in one memory cell), a quad level cell (QLC) NAND flash memory module (that is, a flash memory module which may store 4 bits in one memory cell), and other flash memory modules or other memory modules with the same characteristics.

Each memory cell in the rewritable non-volatile memory module 43 stores one or a plurality of bits based on changes in voltage (hereinafter also referred to as threshold voltage). Specifically, a charge trapping layer is between a control gate and a channel of each memory cell. The amount of electrons in the charge trapping layer may be changed by applying a write voltage to the control gate, thereby changing the threshold voltage of the memory cell. This operation of changing the threshold voltage of the memory cell is also called "writing data into the memory cell" or "programming the memory cell." As the threshold voltage changes, each memory cell in the rewritable non-volatile memory module 43 has a plurality of storage states. Which storage state a memory cell belongs to is determined by applying a read voltage, thereby obtaining one or a plurality of bits stored in the memory cell.

In an exemplary embodiment, the memory cell of the rewritable non-volatile memory module 43 may constitute a plurality of physical programming units, and these physical programming units may constitute a plurality of physical erasing units. Specifically, the memory cell on the same word line may form one or a plurality of physical programming units. If each memory cell stores more than 2 bits, the physical programming unit on the same word line may at least be classified into a lower physical programming unit and an upper physical programming unit. For example, a least significant bit (LSB) of the memory cell belongs to the lower physical programming unit, and a most significant bit (MSB) of the memory cell belongs to the upper physical programming unit. Generally speaking, in MLC NAND flash memory, the writing speed of the lower physical programming unit is greater than the writing speed of the upper physical programming unit, and/or the reliability of the lower physical programming unit is higher than the reliability of the upper physical programming unit.

In an exemplary embodiment, the physical programming unit is the smallest unit of programming, that is, the physical programming unit is the smallest unit for writing data. For example, the physical programming unit may be a physical page or a physical sector. If the physical programming unit is the physical page, these physical programming units may include a data bit area and a redundancy bit area. The data bit area includes a plurality of physical sectors and is configured to store user data, and the redundancy bit area is configured to store system data (for example, management data such as an error correcting code). In an exemplary embodiment, the data bit area includes 32 physical sectors, and the size of one physical sector is 512 bytes (B). However, in other embodiments, the data bit area may also include 8, 16 or more or less physical sectors, and the size of each physical sector may also be larger or smaller. On the other hand, the physical erase unit is the smallest unit of erase. That is, each physical erase unit includes one of the minimum number of erased memory cells. For example, the physical erasing unit is a physical block.

Figure 5:
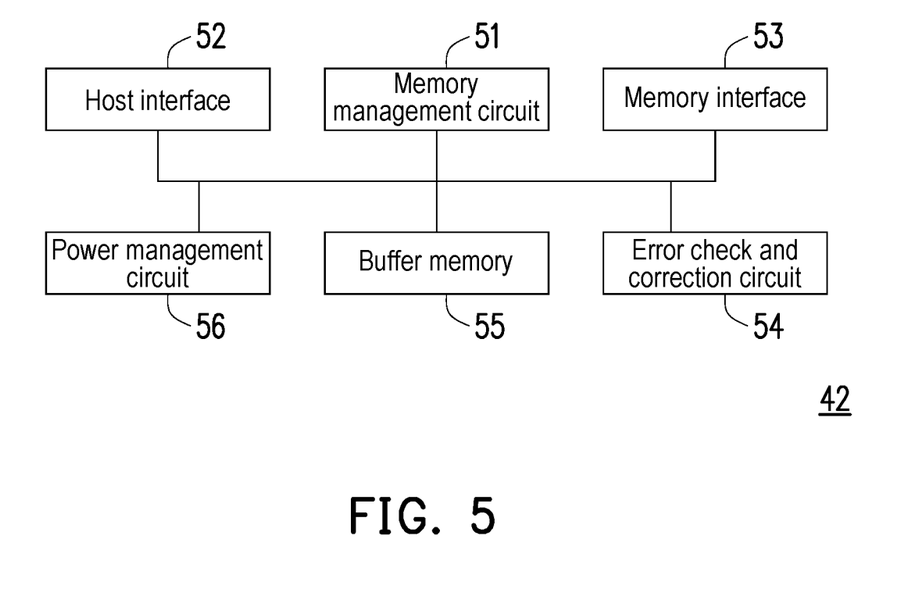
FIG. 5 is a block diagram of a memory control circuit unit according to an exemplary embodiment of the invention.

FIG. 5 is a block diagram of a memory control circuit unit according to an exemplary embodiment of the invention.

Referring to FIG. 5, the memory control circuit unit 42 includes a memory management circuit 51, a host interface 52, and a memory interface 53.

The memory management circuit 51 is configured to control the overall operation of the memory control circuit unit 42. Specifically, the memory management circuit 51 has a plurality of control instructions, and these control instructions are executed to perform the data writing operation, the data reading operation, and the data erasing operation when the memory storage device 10 is operating. The description below of the operation of the memory management circuit 51 is equivalent to the description of the operation of the memory control circuit unit 42.

In an exemplary embodiment, the control instructions of the memory management circuit 51 are implemented in the firmware mode. For example, the memory management circuit 51 has a microprocessor unit (unillustrated) and the ROM (unillustrated), and these control instructions are burned into the ROM. These control instructions are executed by the microprocessor unit to perform the data writing operation, the data reading operation, and the data erasing operation when the memory storage device 10 is operating.

In an exemplary embodiment, the control instructions of the memory management circuit 51 may also be stored in a specific area of the rewritable non-volatile memory module 43 in a programming code mode (for example, a system area in the memory module for storing system data). In addition, the memory management circuit 51 has a microprocessor unit (unillustrated), a ROM (unillustrated), and a RAM (unillustrated). In particular, the ROM has a boot code, and the microprocessor unit first executes the boot code to load the control instructions stored in the rewritable non-volatile memory module 43 into the RAM of the memory management circuit 51 when the memory control circuit unit 42 is enabled. Afterwards, the microprocessor unit runs these control instructions to perform the data writing operation, the data reading operation, and the data erasing operation.

In an exemplary embodiment, the control instructions of the memory management circuit 51 may also be implemented in a hardware mode. For example, the memory management circuit 51 includes a microcontroller, a memory cell management circuit, a memory writing circuit, a memory reading circuit, a memory erasing circuit, and a data processing circuit. The memory cell management circuit, the memory writing circuit, the memory reading circuit, the memory erasing circuit, and the data processing circuit are coupled to the microcontroller. The memory cell management circuit is configured to manage the memory cell or a memory cell group of the rewritable non-volatile memory module 43. The memory writing circuit is configured to issue a writing instruction sequence to the rewritable non-volatile memory module 43 to write data into the rewritable non-volatile memory module 43. The memory reading circuit is configured to issue a read instruction sequence to the rewritable non-volatile memory module 43 to read data from the rewritable non-volatile memory module 43. The memory erasing circuit is configured to issue an erasing instruction sequence to the rewritable non-volatile memory module 43 to erase data from the rewritable non-volatile memory module 43. The data processing circuit is configured to process data to be written into the rewritable non-volatile memory module 43 and data to be read from the rewritable non-volatile memory module 43. The writing instruction sequence, the reading instruction sequence, and the erasing instruction sequence may respectively include one or a plurality of programming codes or instruction codes and are configured to instruct the rewritable non-volatile memory module 43 to perform the corresponding writing operation, the corresponding reading operation, and the corresponding erasing operation. In an exemplary embodiment, the memory management circuit 51 may also issue other types of instruction sequences to the rewritable non-volatile memory module 43 to instruct an execution of corresponding operations.

The host interface 52 is coupled to the memory management circuit 51. The memory management circuit 51 may communicate with the host system 11 through the host interface 52. The host interface 52 may be configured to receive and identify instructions and data transmitted by the host system 11. For example, instructions and data transmitted by the host system 11 may be transmitted to the memory management circuit 51 through the host interface 52. In addition, the memory management circuit 51 may transmit data to the host system 11 through the host interface 52. In this exemplary embodiment, the host interface 52 is compatible with the PCI Express standard. However, it should be understood that the invention is not limited to this. The host interface 52 may also be compatible with the SATA standard, the PATA standard, the IEEE 1394 standard, the USB standard, the SD standard, the UHS-I standard, the UHS-II standard, the MS standard, the MMC standard, the eMMC standard, the UFS standard, the CF standard, the IDE standard or other suitable data transfer standards.

The memory interface 53 is coupled to the memory management circuit 51 and is configured to access the rewritable non-volatile memory module 43. For example, the memory management circuit 51 may access the rewritable non-volatile memory module 43 through the memory interface 53. That is to say, data to be written to the rewritable non-volatile memory module 43 is converted into a format acceptable to the rewritable non-volatile memory module 43 through the memory interface 53. Specifically, if the memory management circuit 51 is to access the rewritable non-volatile memory module 43, the memory interface 53 will transmit the corresponding instruction sequences. For example, these instruction sequences may include the writing instruction sequence instructing to write data, the reading instruction sequence instructing to read data, the erasing instruction sequence instructing to erase data, and is configured to instruct various memory operations (for example, changing operations such as reading voltage levels or performing garbage collection) corresponding to the instruction sequences. These instruction sequences are generated, for example, by the memory management circuit 51 and are transmitted to the rewritable non-volatile memory module 43 through the memory interface 53. These instruction sequences may include one or a plurality of signals or data on the bus. These signals or data may include the instruction codes or the programming codes. For example, the reading instruction sequence includes a read identification code, a memory address, and other information.

In an exemplary embodiment, the memory control circuit unit 42 further includes an error check and correction circuit 54, a buffer memory 55, and a power management circuit 56.

The error check and correction circuit 54 is coupled to the memory management circuit 51 and is configured to perform error check and correction operations to ensure data accuracy. Specifically, the error check and correction circuit 54 generates a corresponding error correcting code (ECC) and/or a corresponding error detecting code (EDC) for data corresponding to the writing instruction when the memory management circuit 51 receives the writing instruction from the host system 11, and the memory management circuit 51 writes data corresponding to the writing instruction and the corresponding ECC and/or the corresponding EDC into the rewritable non-volatile memory module 43. Afterwards, the memory management circuit 51 also reads data corresponding to the ECC and/or the EDC at the same time when the memory management circuit 51 reads data from the rewritable non-volatile memory module 43, and the error check and correction circuit 54 executes the error check and correction operations according to data read by the ECC and/or the EDC.

The buffer memory 55 is coupled to the memory management circuit 51 and is configured to temporarily store data. The power management circuit 56 is coupled to the memory management circuit 51 and is configured to control a power supply of the memory storage device 10.

In an exemplary embodiment, the rewritable non-volatile memory module 43 of FIG. 4 may include a flash memory module. In an exemplary embodiment, the memory control circuit unit 42 of FIG. 4 may include a flash memory controller. In an exemplary embodiment, the memory management circuit 51 of FIG. 5 may include a flash memory management circuit.

Figure 6:
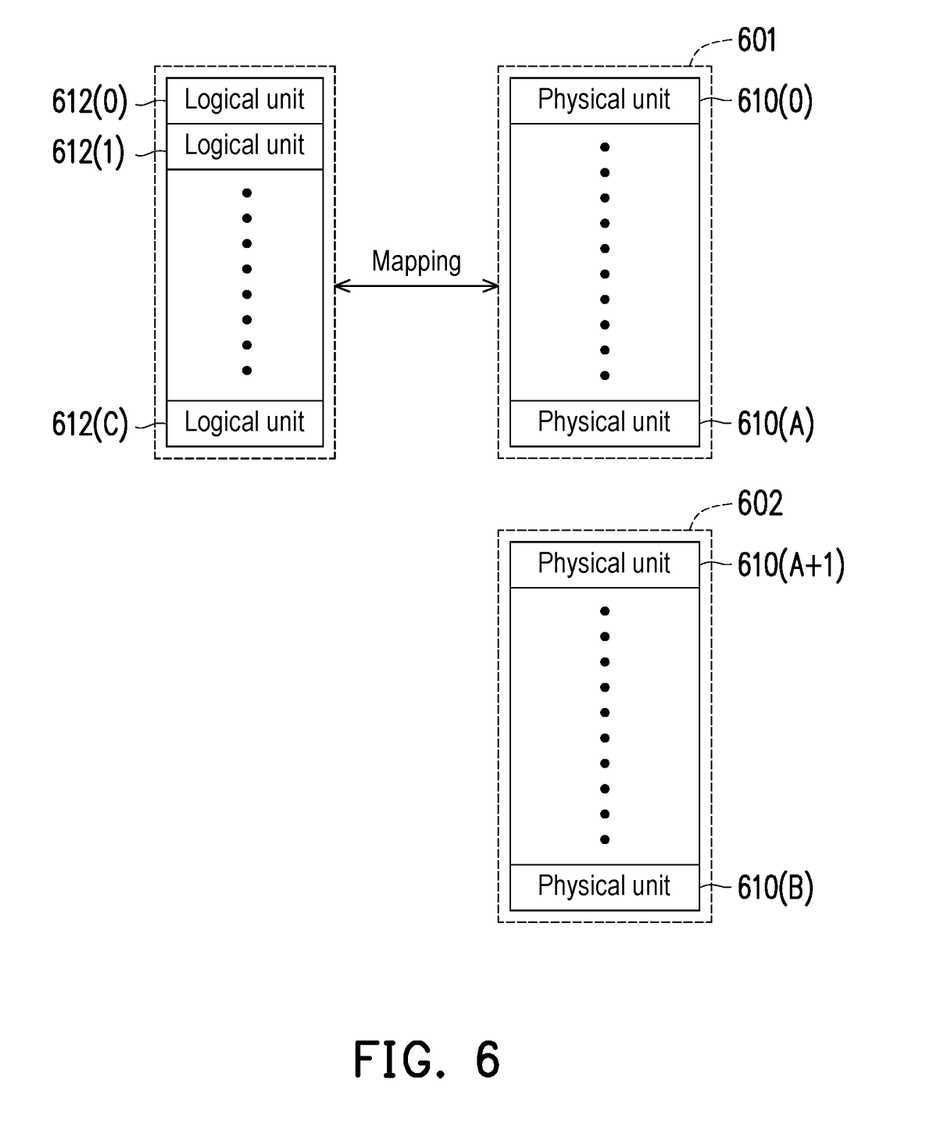
FIG. 6 is a schematic diagram of managing a rewritable non-volatile memory module according to an exemplary embodiment of the invention.

FIG. 6 is a schematic diagram of managing a rewritable non-volatile memory module according to an exemplary embodiment of the invention.

Referring to FIG. 6, the memory management circuit 51 may logically divide physical units 610(0)~610(B) in the rewritable non-volatile memory module 43 into a storage area 601 and a spare area 602. A physical unit refers to a virtual block (VB). A VB may include a plurality of physical programming units. For example, a VB may include one or a plurality of physical erase units.

The physical units 610(0)~610(A) in the storage area 601 are configured to store user data (for example, the user data from the host system 11 of FIG. 1). For example, the physical units 610(0)~610(A) in the storage area 601 may store valid data and invalid data. The physical units 610 (A+1)~610 (B) in the spare area 602 do not store data (for example, the valid data). For example, if a certain physical unit does not store the valid data, then this physical unit may be associated (or added) to the spare area 602. In addition, the physical units in the spare area 602 (or the physical units that do not store the valid data) may be erased. As new data is written, one or a plurality of physical units may be retrieved from the spare area 602 to store the new data. In an exemplary embodiment, the spare area 602 is also called a free pool.

The memory management circuit 51 may dispose logical units 612(0)~612(C) to map the physical units 610(0)~610 (A) in the storage area 601. In an exemplary embodiment, each logical unit corresponds to a logical address. For example, a logical address may include one or a plurality of logical block addresses (LBA) or other logical management units.

It should be noted that a logical unit may be mapped to one or a plurality of physical units. If a certain physical unit is currently mapped by a certain logical unit, it means that the data currently stored in this physical unit includes the valid data. On the contrary, if a certain physical unit is currently not mapped by any logical unit, it means that the data currently stored in this physical unit does not include any valid data.

The memory management circuit 51 may record management data (also called logical-to-physical mapping information) describing a mapping relationship between the logical unit and the physical unit in at least one logical-to-physical mapping table. When the host system 11 is to read data from the memory storage device 10 or write data into the memory storage device 10, the memory management circuit 51 may perform a data accessing operation on the memory storage device 10 according to the information in the logic-to-physical mapping table.

The memory management circuit 51 may read history information from the rewritable non-volatile memory module 43. The history information includes a historical remaining lifetime, a max write size, a cumulative write size, and a write amplification factor (WAF). Specifically, the historical remaining lifetime may be, for example, a lifetime of the rewritable non-volatile memory module 43 when the rewritable non-volatile memory module 43 first leaves the factory or the remaining lifetime calculated by the memory management circuit 51 last time. The max write size is a total storage capacity configured to store write data. The cumulative write size is a storage capacity that has been configured to store write data. The WAF may reflect a ratio of the data to be written into the rewritable non-volatile memory module 43 to the data actually written into the rewritable non-volatile memory module 43.

The memory management circuit 51 may calculate the remaining lifetime according to the history information and a user habit. First, the memory management circuit 51 may calculate a total bytes written (TBW) according to the max write size and the WAF. The formula for calculating the TBW is as follows.

$$TBW = \text{Max Write Size}/WAF$$

To further explain, the TBW may reflect total data which may be written into the rewritable non-volatile memory module 43 just leaving the factory before the rewritable non-volatile memory module 43 ends its lifetime.

Next, the memory management circuit 51 may calculate the remaining lifetime according to the TBW, the cumulative write size, and the user habit. The formula for calculating the remaining lifetime is as follows.

$$\text{Remaining Lifetime} = TBW - \text{Cumulative Write Size}/\text{User habit}$$

Specifically, the user habit is an average write size per unit time. For example: the user's daily average write size. Therefore, the remaining lifetime may reflect how many days the rewritable non-volatile memory module 43 may be completely written out (that is, the plurality of physical programming units in the rewritable non-volatile memory module 43 are all written).

Finally, the memory management circuit 51 may determine whether the remaining lifetime is lower than the preset lifetime. The memory management circuit 51 may generate an early warning signal and output the remaining lifetime and the early warning signal in response to the remaining lifetime being lower than the preset lifetime (for example, 30 days). A length of the preset lifetime may be adjusted according to actual needs, and the invention is not limited. In this way, the memory management circuit 51 may monitor a service lifetime of the rewritable non-volatile memory module 43 and issue an early warning notification in response to the remaining lifetime being lower than the preset lifetime to improve the early warning quality.

In an exemplary embodiment, the memory storage device 10 may be built into a vehicle-mounted device (unillustrated). In response to the remaining lifetime being lower than the preset lifetime, the vehicle-mounted device may control a warning light on an instrument panel (unillustrated) and/or a display screen (unillustrated) in the vehicle-mounted device based on the early warning signal to provide the early warning to the user and improve the early warning quality.

On the other hand, the memory management circuit 51 neither generates the early warning signal nor outputs the remaining lifetime and the early warning signal when the remaining lifetime is equal to or greater than the preset lifetime.

In addition, the memory management circuit 51 may obtain a maximum operating temperature and a quality verification record from the rewritable non-volatile memory module 43. In an exemplary embodiment, the quality verification record may reflect a result of a regular test performed by the rewritable non-volatile memory module 43 before it leaves the factory and/or other test results performed by the rewritable non-volatile memory module 43 after it leaves the factory.

The memory management circuit 51 may determine the reliability of the rewritable non-volatile memory module when the rewritable non-volatile memory module performs the data accessing according to the maximum operating temperature and the quality verification record. For example, if a current operating temperature does not exceed the maximum operating temperature, and the quality verification record reflects that results of all test performed by the rewritable non-volatile memory module 43 are normal, the memory management circuit 51 may determine the rewritable non-volatile memory module 43 has high reliability when the rewritable non-volatile memory module 43 performs the data accessing. On the contrary, if the current operating temperature exceeds the maximum operating temperature and/or the quality verification record reflects the result of at least one of all tests performed by the rewritable non-volatile memory module 43 is abnormal, the memory management circuit 51 may determine the rewritable non-volatile memory module 43 has low reliability when the rewritable non-volatile memory module 43 performs the data accessing.

In an exemplary embodiment, the memory storage device 10 may be built into a vehicle-mounted device (unillustrated). The quality verification record may reflect the result of the regular test performed by the rewritable non-volatile memory module 43 and/or the vehicle-mounted device before the vehicle-mounted leaves the factory and/or other tests performed after it leaves the factory (for example: results of an environmental test or a special stringent test of the vehicle-mounted device).

The memory management circuit 51 may determine the reliability the rewritable non-volatile memory module 43 when the rewritable non-volatile memory module 43 performs the data accessing and/or the reliability of the vehicle-mounted device when the vehicle-mounted device operates according to the maximum operating temperature and the quality verification record. For example, if the current operating temperature does not exceed the maximum operating temperature, and the quality verification record reflects the results of all tests performed by the rewritable non-volatile memory module 43 and/or the vehicle-mounted device are all normal, the memory management circuit 51 may determine the rewritable non-volatile memory module 43 and/or the vehicle-mounted device have high reliability when the rewritable non-volatile memory module 43 and/or the vehicle-mounted device perform the data accessing. On the contrary, if the current operating temperature exceeds the maximum operating temperature and/or the quality verification record reflects all tests performed by the rewritable non-volatile memory module 43 and/or the result of at least one of the tests of the vehicle-mounted device is abnormal, the memory management circuit 51 may determine the rewritable non-volatile memory module 43 and/or the vehicle-mounted device has low reliability when the rewritable non-volatile memory module 43 and/or the vehicle-mounted device perform the data accessing.

Figure 7:
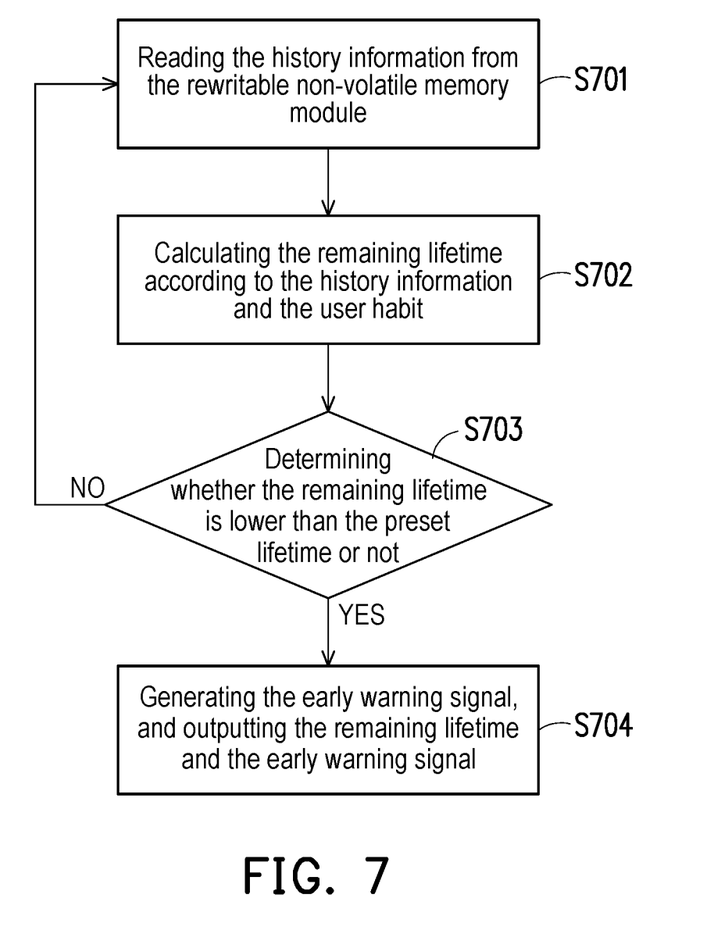
FIG. 7 is a flow chart of a service lifetime monitoring and early warning method according to an exemplary embodiment of the invention.

FIG. 7 is a flow chart of a service lifetime monitoring and early warning method according to an exemplary embodiment of the invention.

Referring to FIG. 7, in step S701, the memory control circuit unit 42 reads the history information from the rewritable non-volatile memory module.

In step S702, the memory control circuit unit 42 calculates the remaining lifetime according to the history information and the user habit.

In step S703, the memory control circuit unit 42 determines whether the remaining lifetime is lower than the preset lifetime.

If the remaining lifetime is lower than the preset lifetime, in step S704, the memory control circuit unit 42 generates the early warning signal and outputs the remaining lifetime and the early warning signal.

On the contrary, if the remaining lifetime is equal to or greater than the preset lifetime, then it returns to step S701. Details of implementation of steps S701 to S704 have been described in the foregoing exemplary embodiments and will not be repeated here.

In summary, exemplary embodiments of the invention may monitor the service lifetime of the rewritable non-volatile memory module and issue the early warning notification in response to the remaining lifetime being lower than the preset lifetime to improve the early warning quality.

Although the invention has been disclosed above through embodiments, the embodiments are not intended to limit the invention. A person having ordinary knowledge in the art may make some changes and modifications without departing from the spirit and scope of the invention. Therefore, the protection scope of the invention shall be defined by the appended claims.

What is claimed is:

1. A service lifetime monitoring and early warning method, configured to comprise a memory storage device of a rewritable non-volatile memory module, the method comprising:

executing a control instruction to read a history information from the rewritable non-volatile memory module by a memory control circuit;

calculating a remaining lifetime according to the history information and a user habit by the memory control circuit; and generating an early warning signal and outputting the remaining lifetime and the early warning signal in response to the remaining lifetime being lower than a preset lifetime by the memory control circuit, wherein the history information comprises a historical remaining lifetime, a max write size, a cumulative write size, and a write amplification factor, wherein calculating the remaining lifetime according to the history information and the user habit by the memory control circuit comprises:

calculating a total bytes written according to the max write size and the write amplification factor by the memory control circuit; and calculating the remaining lifetime according to the total bytes written, the cumulative write size, and the user habit by the memory control circuit, wherein the user habit is an average write size per unit time, obtaining a maximum operating temperature and a quality verification record from the rewritable non-volatile memory module by the memory control circuit, determining a reliability of the rewritable non-volatile memory module according to the maximum operating temperature and the quality verification record by the memory control circuit.

2. A memory storage device, comprising:

a connection interface unit, configured to couple to a host system;

a rewritable non-volatile memory module; and a memory control circuit unit, coupled to the connection interface unit and the rewritable non-volatile memory module, wherein the memory control circuit unit is configured to execute a control instruction to read a history information from the rewritable non-volatile memory module, the memory control circuit unit is further configured to calculate a remaining lifetime according to the history information and a user habit, and the memory control circuit unit is further configured to generate an early warning signal and output the remaining lifetime and the early warning signal in response to the remaining lifetime being lower than a preset lifetime, wherein the history information comprises a historical remaining lifetime, a max write size, a cumulative write size, and a write amplification factor, wherein the memory control circuit unit is further configured to calculate a total bytes written according to the max write size and the write amplification factor, wherein the memory control circuit unit is further configured to calculate the remaining lifetime according to the total bytes written, the cumulative write size, and the user habit, wherein the user habit is an average write size per unit time, wherein the memory control circuit unit is further configured to obtain a maximum operating temperature and a quality verification record from the rewritable non-volatile memory module, wherein the memory control circuit unit is further configured to determine a reliability of the memory storage device according to the maximum operating temperature and the quality verification record.

3. A memory control circuit unit, configured to control a rewritable non-volatile memory module, comprising:

a host interface, configured to couple to a host system;

a memory interface, configured to couple to the rewritable non-volatile memory module; and a memory management circuit, coupled to the host interface and the memory interface, wherein the memory management circuit is configured to execute a control instruction to read a history information from the rewritable non-volatile memory module, the memory management circuit is further configured to calculate a remaining lifetime according to the history information and a user habit, and the memory management circuit is further configured to generate an early warning signal and output the remaining lifetime and the early warning signal in response to the remaining lifetime being lower than a preset lifetime, wherein the history information comprises a historical remaining lifetime, a max write size, a cumulative write size, and a write amplification factor, wherein the memory management circuit is further configured to calculate a total bytes written according to the max write size and the write amplification factor, wherein the memory management circuit is further configured to calculate the remaining lifetime according to the total bytes written, the cumulative write size, and the user habit, wherein the user habit is an average write size per unit time, wherein the memory management circuit is further configured to obtain a maximum operating temperature and a quality verification record from the rewritable non-volatile memory module, wherein the memory management circuit is further configured to determine a reliability of the rewritable non-volatile memory module according to the maximum operating temperature and the quality verification record.

* * * * *